| United States Patent [19] | [11] 3,959,240 |
|---|---|
| Console et al. | [45] May 25, 1976 |

[54] CATALYTIC PROCESS FOR THE PREPARATION OF POLYACRYLONITRILE AND ACRYLONITRILE COPOLYMERS

[75] Inventors: Luciano Console, Mirano (Venice); Alessandro Zecchin, Sassari; Antonio Quarta, Porto Torres (Sassari), all of Italy

[73] Assignee: Societe' Italiana Resine S.I.R. S.p.A., Milan, Italy

[22] Filed: July 8, 1974

[21] Appl. No.: 486,722

[30] Foreign Application Priority Data

July 6, 1973 Italy ................................. 26268/73

[52] U.S. Cl. .......................... 526/341; 260/32.6 N; 260/47 UA; 260/63 N; 260/79.3 M; 526/90; 526/222; 526/72; 526/225; 526/328; 526/342; 526/347
[51] Int. Cl.² ................ C08F 120/44; C08F 220/44
[58] Field of Search .............. 260/85.5 R, 85.5 M, 260/85.5 F, 85.5 D, 85.5 P, 88.7 R, 88.7 C, 88.7 D, 88.7 G

[56] References Cited

UNITED STATES PATENTS

| | | | |
|---|---|---|---|
| 2,750,357 | 6/1956 | Bredereck et al. | 260/88.7 D |
| 3,065,212 | 11/1962 | Milford et al. | 260/85.5 R |
| 3,174,954 | 3/1965 | Nakayama et al. | 260/85.5 R |
| 3,635,927 | 1/1972 | Johnston | 260/85.5 M |

*Primary Examiner*—Harry Wong, Jr.
*Attorney, Agent, or Firm*—Sughrue, Rothwell, Mion, Zinn & Macpeak

[57] ABSTRACT

A process for polymerizing acrylonitrile monomer or copolymerizing a mixture of acrylonitrile monomer and further ethylenically unsaturated monomers copolymerizable therewith, which comprises contacting the monomer or mixture of monomers in an aqueous medium at a temperature not exceeding 55°C with a catalytic system comprising a watersoluble persulphate, a hydroxylamine mono- or disulfonate and a water-soluble salt of a variable valence metal, such as a ferrous salt.

10 Claims, No Drawings

CATALYTIC PROCESS FOR THE PREPARATION OF POLYACRYLONITRILE AND ACRYLONITRILE COPOLYMERS

The invention relates to a process for catalytic polymerization of acrylonitrile and copolymerization of acrylonitrile with further ethylenically unsaturated monomers copolymerizable therewith.

It is known that polyacrylonitrile and copolymers of acrylonitrile containing at least 85% by weight of acrylonitrile are largely used in the art, more particularly for producing fibers.

The said polymers are prepared in the art by polymerization of acrylonitrile or copolymerization of the latter with one or more ethylenically unsaturated compounds using suitable catalysts and usually operating in an aqueous reaction medium.

More particularly, known catalysts are peroxides generally, such as benzoyl peroxide, and alkali metal persulphates or the combinations of said compounds with reducing substances, known as redox systems.

In known polymerization, in which peroxides are used as catalysts, relatively high reaction temperatures are usually required in order to provide industrially acceptable conversion rates of the monomers in to the corresponding polymer.

Though the said processes allow sufficiently high conversion percentages of the monomers, the polymerization temperature used often leads to polymers of lower standard.

Therefore, catalytic systems deprived of peroxide have been developed in the art, which are capable of polymerizing or copolymerizing acrylonitrile within a range of relatively low temperatures.

Examples of such catalytic systems are redox systems in which the oxidant, consisting of an hydroxylamine derivative is employed in combination with a reducing agent consisting of a salt of a reduced valence metal, or an inorganic compound of tetravalent sulphur.

By using such catalytic systems, some properties of the polymers and copolymers of acrylonitrile can be improved.

However, under the conditions, more particularly the temperature conditions, within which the said improvements can be achieved, both polymerization speed and monomer conversion into the corresponding polymer are low.

The need was therefore felt for a process which would enable one to polymerize or copolymerize acrylonitrile at both a high rate and high conversion by operating within the range of temperatures in which the polymer properties are improved.

Such desirable results are obtained by the process of the invention which is essentially based on the use of a catalytic system more particularly effective in low temperature polymerization or copolymerization.

An object of the present invention is therefore to provide a process for polymerization of acrylonitrile or copolymerization of acrylonitrile with a further ethylenically unsaturated monomer copolymerizable therewith.

Further objects of the invention will be understood from the following description.

Thus, the invention provides a process for the polymerization of acrylonitrile monomer and copolymerization of a mixture of acrylonitrile monomer with a further ethylenically unsaturated monomer copolymerizable therewith, characterized by contacting the monomer or the mixture of monomers in an aqueous medium at a temperature not exceeding 55°C with a catalytic system comprising: a water-soluble persulphate, a hydroxylamine mono- or disulfonate and a water-soluble salt of a variable valence metal.

The preferred water-soluble persulphates are alkali metal persulphates, such as sodium or potassium persulphates, and ammonium persulphate.

The preferred hydroxylamine derivatives are water-soluble salts of hydroxylamine sulfonic acids, such as alkali metal salts of the hydroxylamine mono- and disulphonic acids.

Among variable valence metals iron, which is fed to the polymerization medium in the form of a water-soluble ferrous salt such as ferrous sulphate or other water-soluble bivalent iron salts, is preferred.

The objects of the invention are advantageously attained by maintaining a molar ratio of the persulphate to the hydroxylamine sulfonate from 0.1 : 1 to 10 : 1, the molar ratio of said persulphate to the ferrous salt being from $10^2:1$ to $10^5:1$. The preferred values of said ratios are of 0.2:1 to 5:1 and $10^3:1$ to $10^4:1$, respectively.

The objects of this invention are conveniently fulfilled by providing the catalytic system in a proportion from 0.05 to 10, preferably 0.2 to 4 parts by weight to 100 parts by weight monomer or mixture of monomers.

The catalytic system used in the process according to the invention comprises a derivative of hydroxylamine as previously described. The said derivative acts here as a reducing agent, owing to the presence of the persulphate and the salt of a variable valence metal.

The mere combination of a persulphate with a hydroxylamine derivative will not afford any appreciable polymerization rate when operating within the temperature range of the invention.

The process of the invention can be applied to the polymerization of acrylonitrile monomer, as well as to the copolymerization of a mixture of acrylonitrile monomer with a wide range of ethylenically unsaturated copolymerizable monomers such as vinyl acetate, methyl vinyl ketone, methyl acrylate and methyl methacrylate, dimethyl itaconate, butyl methacrylate, butyl acrylate, diethyl maleate, vinyl trimethyl acetate, methacrylonitrile, styrene, vinyl ethylexyl ether, octyl methacrylate, alpha-methylstyrene, 4-metoxystyrene, ethylene sulfonic acid, allyl sulfonic acid, methallyl sulfonic acid, halogenated monoethylene compounds and N-vinyl compounds.

Two or more compounds can be copolymerized with acrylonitrile, if desired.

The preferred copolymers for the purposes of the present invention are those containing acrylonitrile in a proportion from 85 to 95% by weight, methyl acrylate, vinyl acetate, styrene or methyl vinyl ketone in a proportion from 4 to 14% by weight and a copolymerizable sulfonate such as sodium or potassium styrene sulfonate or sodium methallyl sulfonate in a proportion from 0.1 to 5% by weight.

The polymerization or copolymerization of acrylonitryle is preferably effected at a temperature from 40° to 55°C. The substantially full polymerization or copolymerization of the monomer or mixture of monomers depends on the selected temperature, the concentration of the monomer or of the mixture of monomers, the catalyst concentration. Advantageously, the polymerization or copolymerization period is from 10 minutes to 24 hours. The polymerization or copolymerization reaction can be carried out by conventional means in an aqueous medium in which the constituents of the catalytic system are soluble and the reagents and reaction products uniformly distributed. It is therefore convenient to operate in a stirred medium, in which the overall concentration of the monomer or mixture of monomers and polymer or copolymer is from 10 to 33% by weight. The polymerization or copolymerization can be carried out either discontinuously or continuously. In the latter case two or more reactors are operated in series.

In any case, on completion of the reaction the polymer or copolymer is separated from the aqueous medium by filtering or centrifuging and washed and dried by conventional techniques.

Moreover, by operating according to the present invention, the polymerization or copolymerization reaction proceeds in an easily controllable manner, the resulting polymers or copolymers being suitable for the production of mechanically strong fibers endowed with improved color and heat stability properties.

The following experimental examples are given for the purpose of illustrating the present invention without in any way limiting the latter.

EXAMPLE 1

A polymerization reactor having a glazed inner wall fitted with a mechanical stirrer and a heat-exchange jacket is used. The reactor is charged with 500 parts deionized water, 100 parts acrylonitrile, 0.5 parts potassium persulphate, 0.5 parts of potassium hydroxylamine disulfonate dihydrate and 0.001 parts ferrous sulphate. The parts are understood to be by weight.

After flushing the reactor by means of a nitrogen stream, the temperature of the mass is brought to 50°C and stirring is effected at this temperature during three hours till a polymer slurry of pH 2.1 is obtained.

The slurry is filtered, thoroughly washed with water, again filtered, the solids being finally dried at 80°C in air yielding a white polymer. The monomer conversion into the corresponding polymer is 35%, the polymer having a specific viscosity of 0.170, the determination of which being effected at 25°C in a solution of 0.1 g polymer to 100 ml dimethylformamide.

The polymer is dissolved in dimethylacetamide at 80°C to yield a solution containing 22 g polymer for each 100 ml solvent.

The solution is then extruded at a rate of 5 meters/minute into an aqueous solution containing 50% by weight dimethylacetamide. The extruded fibers are washed then drawn to four times their length in boiling water, finally dried. The resulting 2.8 denier fibers are of high mechanical properties, whiteness and heat stability.

EXAMPLE 2

The procedure of Example 1 is followed, the reactor being charged with 500 parts deionized water, 92 parts acrylonitrile, 0.5 parts sodium methallyl sulfonate, 7.5 parts methylacrylate, 1 part potassium persulphate, 0.5 parts potassium hydroxylamine disulfonate dihydrate and 0.0005 parts ferrous sulphate.

The parts are understood to be by weight.

The temperature is maintained during 3 hours at 50°C, while the mass is stirred till a copolymer slurry of pH 2.2 is obtained. The slurry is filtered, thoroughly washed with water, again filtered, the solids being dried at 80°C in air to yield a white copolymer. The copolymer yield amounts to 74% with respect to the monomers feed. The specific viscosity of the copolymer is 0.210 measured under the conditions of Example 1. The copolymer is dissolved in dimethylacetamide at 80°C to obtain a solution containing 19g polymer for each 100 ml. solvent. The solution is extruded at a rate of 7 meter/minute into an aqueous solution containing 55% by weight dimethylacetamide. The extruded fibers are washed, drawn to six times their length in boiling water and dried. After treatment at 125°C in saturated steam 3.2 denier fibers are obtained having a tenacity of 2.4 g/denier and an elongation at break of 42%. The fibers show satisfactory whiteness and heat stability.

EXAMPLE 3

The same procedure as in Example 1 is followed, the reactor being charged with 50 parts deionized water, 91 parts acrylonitrile, 9 parts vinyl acetate, 2 parts potassium persulphate, 0.5 parts potassium hydroxylamine disulfonate dihydrate, 0.0005 parts ferrous sulphate. The parts are understood by weight. The mass is stirred at 50°C during 90 minutes till a copolymer slurry of pH 2.5 is obtained. The slurry is filtered, thoroughly washed with water, again filtered, the resulting solids being dried at 80°C in air to yield a white copolymer. The conversion of the monomers into the corresponding copolymer is 75%. The specific viscosity of the copolymer is 0.132, the determination being effected as described in Example 1. The copolymer is dissolved in anhydrous dimethylacetamide at 80°C to yield a solution containing 29g copolymer for each 100 ml solvent. The solution is extruded at a speed of 6 meters/minute into an aqueous solution containing 48% dimethylacetamide. The extruded fibers are washed, drawn to five times their length in boiling water and dried. After treatment at 132°C in saturated steam 2.9 denier fibers are obtained having a tenacity of 2.6 g/denier and an elongation at break of 38%. The fibers show moreover a satisfactory whiteness and an excellent heat stability.

EXAMPLE 4

The procedure of Example 1 is followed, the reactor being charged with 500 parts deionized water, 93 parts acrylonitrile, 7 parts styrene, 1 part ammonium persulphate, 1 part potassium hydroxylamine disulfonate dihydrate and 0.001 parts ferrous sulphate. The parts are understood by weight. The mass is stirred during 40 minutes at a temperature of 45°C and yields a copolymer slurry of pH 2.6. The slurry is filtered, thoroughly washed with water, again filtered, the resulting solids being dried at 80°C in air to yield a white copolymer. The monomers conversion into the corresponding copolymer is 54%. The specific viscosity of the copolymer is 0.188, the determination being effected as described in Example 1. The copolymer is dissolved in dimethylacetamide containing 1.4% by weight acetic acid, at 90°C, yielding a solution containing 21.5 g copolymer for each 100 ml solvent. The solution is then extruded at a rate of 6 meters/minute into a solution containing 50% by weight dimethylacetamide. The extruded fibers are washed, drawn to 6 times their length in boiling water and dried. After treatment at 140°C in saturated steam, 3 denier fibers are obtained of a tenacity of 2.3 g/denier and an elongation at break of 44%. The said fibers show moreover an excellent whiteness and a satisfactory heat stability.

EXAMPLE 5 (comparative example)

The procedure of Example 1 is followed, the reactor being charged with 500 parts deionized water, 100 parts acrylonitrile, 1 part potassium persulphate, 1.7 parts potassium hydroxylamine disulfonate dihydrate and 0.01 parts of the disodium salt of the ethylenediaminetetraacetic acid. The temperature is maintained at 50°C while stirring during a period of 6 hours. During this period the reaction mass is in the form of an opalescent liquid containing polymer traces only. The polymerization yield amounts to about 1%.

What we claim is:

1. The method of polymerizing a monomer composition containing at least 85% by weight of acrylonitrile and up to 15 % by weight of a further ethylenically unsaturated monomer copolymerizable therewith, which comprises contacting the monomer composition in an aqueous medium at a temperature from 40° to 55°C., with a catalytic system comprising a water soluble persulphate, a water-soluble hydroxylamine mono- or disulphonic acid salt and a watersoluble ferrous salt wherein the molar ratio of said persulphate to said ferrous salt is from $10^2$:1 to $10^5$:1, the molar ratio of said persulphate to said hydroxylamine sulphonic acid salt is from 0.1:1 to 10:1 and the said catalytic system in a proportion of from 0.05 to 10 parts by weight to 100 parts by weight of said monomer composition.

2. The method set forth in claim 1 wherein the said persulphate is an alkali metal or ammonium persulphate.

3. The method set forth in claim 1 wherein the said mono- or disulphonic acid salt is an alkali metal salt of hydroxylamine mono- or disulfonic acid.

4. The method set forth in claim 1 wherein the said molar ratio of said persulphate to said ferrous salt is from $10^3$:1 to $10^4$:1.

5. The method set forth in claim 1 wherein the molar ration of said persulphate to said hydroxylamine sulphonic acid salt is from 0.2:1 to 5:1.

6. The method set forth in claim 1 wherein the proportion of said catalytic system is from 0.2 to 4 parts by weight of said monomer composition.

7. The method set forth in claim 1 wherein the polymerization time is from 10 minutes to 24 hours.

8. The method set forth in claim 1 wherein the overall concentration of the monomer or mixture of monomers and polymer in the aqueous medium is from 10 to 33% by weight.

9. The method of polymerizing a monomer composition containing at least 85% by weight of acrylonitrile and up to 15% by weight of a further ethylenically unsaturated monomer copolymerizable therewith, which comprises the steps of providing an aqueous medium with a monomer or mixture of monomers and a catalytic system comprising an alkali metal or ammonium persulphate, an alkali metal salt of a hydroxylamine mono- or disulphonic acid and a water-soluble ferrous salt in a molar ratio of said persulphate to said ferrous salt from $10^2$:1 to $10^5$:1 and a molar ratio of said persulphate to said hydroxylamine sulphonic acid from 0.1:1 to 10:1, the catalytic system being present in a proportion from 0.05 to 10 parts by weight to 100 parts by weight monomer or mixture of monomers, thereby contacting the monomer or mixture of monomers with the catalytic system in the aqueous medium while operating at a temperature from 40° to 55°C for a period of time from 10 minutes to 24 hours and while maintaining an overall concentration of the monomer or mixture of monomers and polymer in the aqueous medium from 10 to 33% by weight.

10. The method set forth in claim 9 wherein the molar ratios of persulphate to said ferrous salt and said hydroxylamine sulfonate are from $10^3$:1 to $10^4$:1 and from 0.2:1 to 5:1, respectively, and the proportion of said catalytic system is from 0.2 to 4 parts by weight.

* * * * *